United States Patent
Nishihara et al.

(10) Patent No.: US 9,680,933 B2
(45) Date of Patent: Jun. 13, 2017

(54) COMPUTER SYSTEM

(71) Applicant: HITACHI, LTD., Tokyo (JP)

(72) Inventors: Shin Nishihara, Tokyo (JP); Keishi Tamura, Tokyo (JP); Kunihiko Nashimoto, Tokyo (JP)

(73) Assignee: HITACHI, LTD., Tokyo (JP)

(*) Notice: Subject to any disclaimer, the term of this patent is extended or adjusted under 35 U.S.C. 154(b) by 254 days.

(21) Appl. No.: 14/647,678

(22) PCT Filed: Mar. 15, 2013

(86) PCT No.: PCT/JP2013/057397
§ 371 (c)(1),
(2) Date: May 27, 2015

(87) PCT Pub. No.: WO2014/141466
PCT Pub. Date: Sep. 18, 2014

(65) Prior Publication Data
US 2015/0319245 A1 Nov. 5, 2015

(51) Int. Cl.
*G06F 15/167* (2006.01)
*H04L 29/08* (2006.01)
*G06F 3/06* (2006.01)

(52) U.S. Cl.
CPC ........ *H04L 67/1097* (2013.01); *G06F 3/0604* (2013.01); *G06F 3/067* (2013.01); *G06F 3/0647* (2013.01); *H04L 67/1002* (2013.01)

(58) Field of Classification Search
CPC ............. H04L 67/1097; H04L 67/1002; G06F 3/0604; G06F 3/0647; G06F 3/067
(Continued)

(56) References Cited

U.S. PATENT DOCUMENTS

2008/0140944 A1   6/2008   Arakawa et al.
2008/0282031 A1   11/2008  Tanoue
(Continued)

FOREIGN PATENT DOCUMENTS

JP   2008-040571 A   2/2008
JP   2008-146627 A   6/2008
(Continued)

*Primary Examiner* — Chris Parry
*Assistant Examiner* — Weiwei Stiltner
(74) *Attorney, Agent, or Firm* — Volpe and Koenig, P.C.

(57) ABSTRACT

A computer system includes a server that issues an access request with a virtual volume among the plurality of virtual volumes allocated in a plurality of storage apparatuses as an access target and measures a latency in each access path connecting each storage apparatus and the server, and a plurality of control units which are disposed in each storage apparatus and control the I/O of data. Among the plurality of control units, a main control unit that controls the migration of a migration source virtual volume selects, as a migration destination storage apparatus, one storage apparatus connected to an access path from which was obtained a second measured value, which is a measured value that is smaller than a first measured value indicating a latency in an access path connecting a migration source storage apparatus, which includes the migration source virtual volume, and the server, and indicates a latency in an access path connecting a storage apparatus, other than the migration source storage apparatus, and the server, and allocates a migration destination virtual volume in the migration destination storage apparatus.

9 Claims, 14 Drawing Sheets

(58) Field of Classification Search
    USPC .......................................................... 709/213
    See application file for complete search history.

(56) References Cited

U.S. PATENT DOCUMENTS

| | | |
|---|---|---|
| 2009/0144732 A1 | 6/2009 | Tanaka |
| 2010/0318579 A1 | 12/2010 | Satoyama et al. |
| 2011/0246740 A1 | 10/2011 | Yata et al. |

FOREIGN PATENT DOCUMENTS

| | | |
|---|---|---|
| JP | 2008-250961 A | 10/2008 |
| JP | 2009-134397 A1 | 6/2009 |
| JP | 2011-221660 A | 11/2011 |

| VOLUME ID | WWN (SERVER INITIATOR PORT) | I/O HISTORY (Yes = 1, No = 0) |
|---|---|---|
| LU1 | iWWN1 | 1 |
| LU1 | iWWN2 | 0 |
| : | : | : |

(b)

| VOLUME ID | WWN | RANDOM WRITE/READ I/O COUNT | SEQUENTIAL WRITE/READ I/O COUNT |
|---|---|---|---|
| LU1 | iWWN1 | 50 | 25 |
| LU1 | iWWN2 | 20 | 10 |
| : | : | : | : |

(b)

| VOLUME ID | VIRTUAL LDEV ID | REAL LDEV ID |
|---|---|---|
| LU1 | 01:01 | 10:10 |
| LU2 | 02:02 | 20:20 |
| : | : | : |

| 350A | 350B | 350C | 350D | 350E | 350F | 350G |
|---|---|---|---|---|---|---|
| VOLUME ID | PHYSICAL STORAGE ID | WWN (SERVER INITIATOR PORT) | RANDOM WRITE/READ I/O COUNT | SEQUENTIAL WRITE/READ I/O COUNT | I/O CHARAC-TERISTICS | ACCESS FREQUENCY |
| LU1 | ST1 | iWWN1 | 50 | 25 | RANDOM | 75 |
| LU2 | ST2 | iWWN2 | 10 | 25 | SEQUENTIAL | 35 |
| .. | .. | .. | | | .. | .. |

FIG.5

| WWN (SERVER INITIATOR PORT) | WWN (SERVER TARGET PORT) | PHYSICAL STORAGE ID | LATENCY (sec) |
|---|---|---|---|
| iWWN1 | tWWN1 | ST1 | 1m |
| iWWN1 | tWWN1 | ST2 | 10μ |
| iWWN2 | tWWN2 | ST1 | 10μ |
| iWWN2 | tWWN2 | ST2 | 10μ |
| : | : | : | : |

| PHYSICAL STORAGE USER ID | WWN (SERVER INITIATOR PORT) |
|---|---|
| Cust1 | iWWN1, iWWN3 |
| Cust2 | iWWN2 |
| : | : |

(b)

| VIRTUAL STORAGE USER ID | PHYSICAL STORAGE ID | NUMBER OF PERMITTED MAXIMUM VOLUME |
|---|---|---|
| Cust1 | ST1 | 2 |
| Cust2 | ST1 | 1 |
| Cust1 | ST2 | 4 |
| Cust2 | ST2 | 2 |
| : | : | : |

*Table 600:*

| VOLUME ID (600A) | PHYSICAL STORAGE ID (600B) | WWN (SERVER INITIATOR PORT) (600C) | RANDOM WRITE/ READ I/O COUNT (600D) | SEQUENTIAL WRITE/READ I/O COUNT (600E) |
|---|---|---|---|---|
| LU1 | ST1 | iWWN1 | 50 | 25 |
| LU2 | ST2 | iWWN1 | 10 | 25 |
| : | : | : | : | : |

(b)

*Table 700:*

| VOLUME ID (700A) | WWN (SERVER INITIATOR PORT) (700B) | PHYSICAL STORAGE ID (700C) | I/O LOAD POTENTIAL (msec) (700D) |
|---|---|---|---|
| LU1 | iWWN1 | ST1 | 225 |
| LU1 | iWWN1 | ST2 | 700 |
| LU2 | iWWN1 | ST1 | 185 |
| LU2 | iWWN1 | ST2 | 300 |

FIG.12

| WWN (SERVER INITIATOR PORT) 800A | WWN (SERVER TARGET PORT) 800B | PHYSICAL STORAGE ID 800C | LATENCY MEASUREMENT CONDITION 800D | LATENCY (sec) 800E |
|---|---|---|---|---|
| iWWN1 | tWWN1 | ST1 | RANDOM | 1m |
| iWWN1 | tWWN1 | ST2 | RANDOM | 10m |
| iWWN1 | tWWN1 | ST1 | SEQUENTIAL | 7m |
| iWWN1 | tWWN1 | ST2 | SEQUENTIAL | 8m |
| iWWN2 | tWWN2 | ST1 | RANDOM | 10μ |
| iWWN2 | tWWN2 | ST2 | RANDOM | 10μ |
| iWWN2 | tWWN2 | ST1 | SEQUENTIAL | 10μ |
| iWWN2 | tWWN2 | ST2 | SEQUENTIAL | 10μ |
| .. | .. | .. | .. | .. |

800

COMPUTER SYSTEM

TECHNICAL FIELD

The present invention relates to a computer system which logically manages a plurality of storage apparatuses as one virtual storage apparatus.

BACKGROUND ART

In a computer system in which a plurality of storage apparatuses are connected to a host computer via a network, a scheme of logically managing a plurality of storage apparatuses as one storage resource is being adopted. Here, the computer system adopts a configuration where, for example, alternate path software is installed in the host computer, and the host computer uses the function of the alternate path hostware to logically recognize a plurality of storage systems as one storage resource (virtual storage system) (refer to PTL 1). The alternate path software manages the logical path between the host computer and the logical storage devices (LDEVs) in the virtual storage system, and executes alternate path control. Alternate path control is the control of deciding which logical path to use among a plurality of logical paths for accessing the LDEV (Logical Device Logical Unit).

Here, each storage system manages the identifier, the LUN (Logical Unit Number) and the global LDEV number of the storage system in the virtual storage system for each logical path. Thus, the host computer can access the same LDEV regardless of which logical path among the plurality of logical paths is used for accessing the virtual storage system.

CITATION LIST

Patent Literature

[PTL 1] JP-A-2008-40571

SUMMARY OF INVENTION

Technical Problem

PTL 1 discloses that, in cases of managing the LDEV in each storage system; for example, when migrating an LDEV in a certain storage system to another storage system, the control right of the LDEV to be migrated is migrated from the migration source storage system to the migration destination storage system without changing the global LDEV number of the LDEV. Nevertheless, PTL 1 gives no consideration to the access frequency or the responsiveness in the logical path upon selecting the LDEV to be migrated or the migration destination of the LDEV. If data of the LDEV is migrated to another storage system without giving consideration to the responsiveness in the logical path, when the responsiveness in the logical path connecting the migration destination storage system and the host computer is low, the access performance to the data of the LDEV allocated in the migration destination storage system will deteriorate. In particular, when the number of LDEVs in the virtual storage system increases, the access performance to each LDEV will deteriorate unless the allocation of the respective LDEV's is determined in consideration of the responsiveness in the logical path.

The present invention was devised in view of the problems of the conventional technology, and an object of this invention is to provide a computer system capable of improving the access performance of a server to an access target.

Solution to Problem

In order to achieve foregoing object, the present invention is a computer system comprising a plurality of storage apparatuses including a plurality of virtual volumes to which are assigned one or more logical volumes that are built in a storage area of a plurality of storage devices, and a server that is connected to the plurality of storage apparatuses via a network, and issues an access request with a virtual volume belonging to one of the storage apparatuses among the plurality of virtual volumes as an access target, wherein the server includes a measurement unit for measuring a latency in a plurality of access paths connecting each of the storage apparatuses and the server, each of the storage apparatuses includes a control unit for controlling I/O of data to and from a virtual volume belonging to each of the storage apparatuses, and, among the control units belonging to each of the storage apparatuses, a main control unit, which selects a migration source virtual volume to be migrated among the plurality of virtual volumes and manages the selected migration source virtual volume, compares, among measured values of the measurement unit, a first measured value indicating a latency in a first access path connecting a migration source storage apparatus, which includes the migration source virtual volume, and the server, and one or more second measured values indicating a latency in one or more second access paths connecting one or more other storage apparatuses, which are different from the migration source storage apparatus, and the server, selects, as a migration destination storage apparatus, one storage apparatus among one or more storage apparatuses connected to a second access path indicating a latency of a second measured value that is smaller than the first measured value when there is a second measured value that is smaller than the first measured value among the second measured values, and, when a migration condition of the selected migration source virtual volume is satisfied, allocates a migration destination virtual volume, which is to become a migration destination of the selected migration source virtual volume, in the selected migration destination storage apparatus.

Advantageous Effects of Invention

According to the present invention, access performance of a server to an access target can be improved.

BRIEF DESCRIPTION OF DRAWINGS

FIG. 3(a) is a configuration diagram of the volume I/O reception information table, FIG. 3(b) is a configuration diagram of the related information table of the volume and the I/O count, and FIG. 3(c) is a configuration diagram of the volume management table.

FIG. 4 is a configuration diagram of the related information table of the volume and the access frequency.

FIG. 5 is a configuration diagram of the latency information table.

FIG. 6(a) is a configuration diagram of the related information table of the virtual storage user and the server, and FIG. 6(b) is a configuration diagram of the related information table of the virtual storage user and the maximum volume.

FIG. 11(a) is a configuration diagram of the volume related information table according to the second Example, and FIG. 11(b) is a configuration diagram of the related information table of the volume and the I/O load potential according to the second Example.

FIG. 12 is a configuration diagram of the latency statistical information table according to the second Example.

DESCRIPTION OF EMBODIMENTS

Example 1

In this Example, a migration destination storage apparatus of an LU to be migrated is determined based on a latency in a plurality of access paths connecting a server and a plurality of storage apparatuses. The first Example of the present invention is now explained with reference to the drawings.

Figure 1:
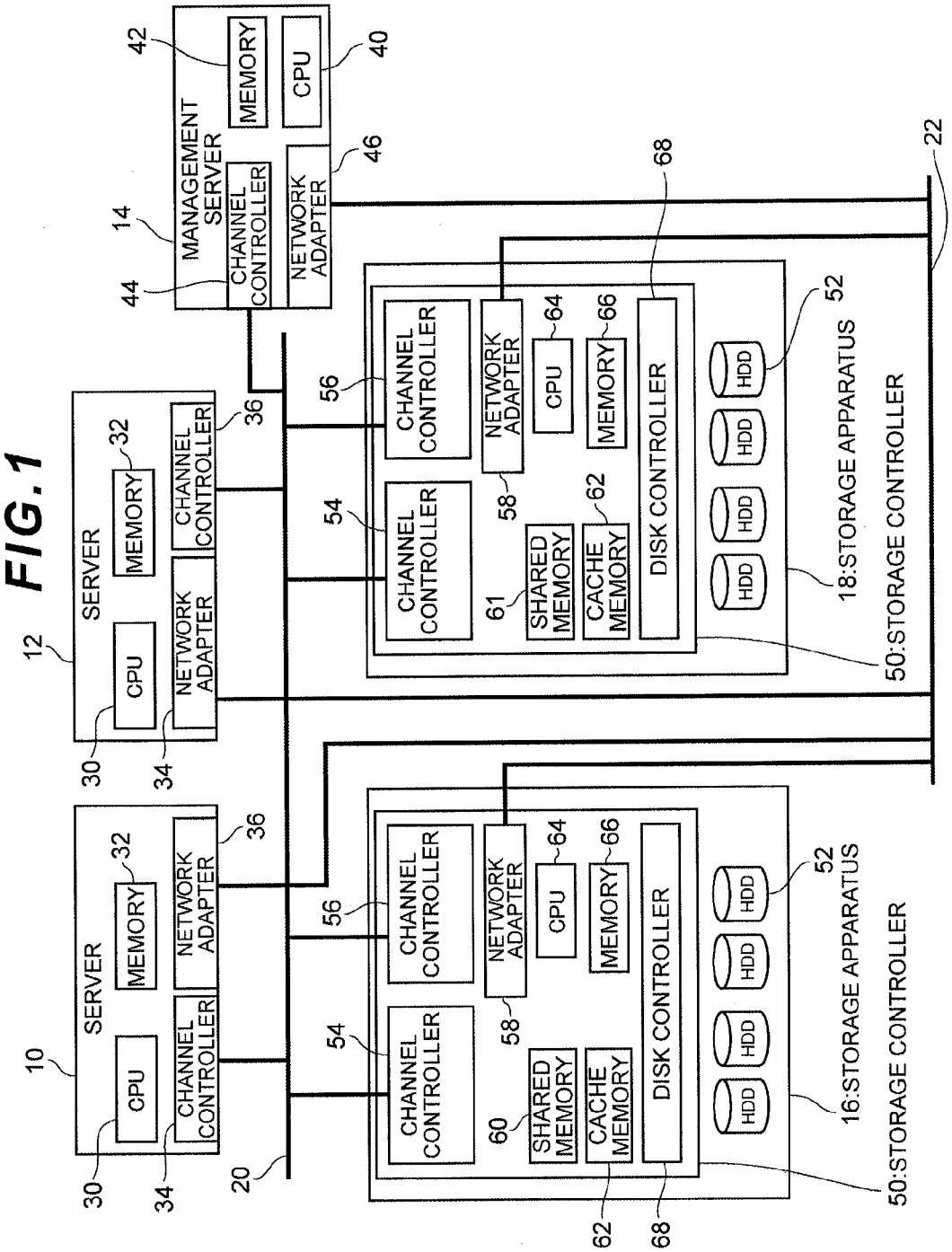
FIG. 1 is a configuration diagram of the computer system showing the first Example of the present invention.

FIG. 1 is a configuration diagram of the computer system indicated in the first Example. In FIG. 1, the computer system includes a plurality of servers 10, 12, a management server 14, and a plurality of storage apparatuses 16, 18, and the respective servers 10, 12, the management server 14 and the respective storage apparatuses 16, 18 are respectively connected via a network 20, and connected via a management network 22.

The respective servers 10, 12 are configured as a computer device or a host computer including a CPU 30, a memory 32, a channel controller 34, and a network adapter 36, and the respective components are mutually connected via an internal network (not shown), the channel controller 34 is connected to the network 20, and the network adapter 36 is connected to the management network 22. The channel control unit 34 includes a plurality of ports, and each port is connected to a port provided to a network switch on a network via a network cable such as an optical fibre. Assigned to each port is a network address (for example, WWN or the like). The memory 32 stores an OS (Operating System), an application program, and the like. The CPU 30 functions as a measurement unit for measuring, according to I/O characteristics, a latency in a plurality of access paths connecting the respective storage apparatuses 16, 18 and the servers 10, 12. Note that, while the allocation of three or more servers is anticipated in addition to the servers 10, 12, in the ensuing explanation, the server 10 is mainly explained.

As a result of the CPU 30 activating an application program, the server 10 can issue an access request; for example, a write request or a read request, which designates a logical volume provided by the respective storage apparatuses 16, 18, and access that logical volume. When the server 10 is configured from an open system computer, used as the communication protocol may be, for example, a TCP/IP (Transmission Control Protocol/Internet Protocol), an FCP (Fibre Channel Protocol), or an iSCSI (internet Small Computer System Interface). Moreover, the server 10 can acquire an identifier, an apparatus number, an LU number, and path information of the respective logical volumes from the respective storage apparatuses 16, 18 by sending an inquiry command such as an "Inquiry Command" to the respective storage apparatuses 16, 18.

The management server 14 is configured as a management computer including a CPU 40, a memory 42, a channel controller 44, and a network adapter 46, and the respective components are mutually connected via an internal network (not shown), the channel controller 44 is connected to the network 20, and the network adapter 46 is connected to the management network 46. The memory 42 stores an OS, a management program, and the like. As a result of the CPU 40 activating a management program, the management server 14 sends and receives information to and from the respective servers 10, 12 via the channel controller 44 and the network 20, and sends and receives information to and from the respective storage apparatuses 16, 18 via the network adapter 46 and the management network 22.

The respective storage apparatuses 16, 18 are configured, as a physical storage apparatus, from a storage controller 50 and a plurality of storage devices 52. The storage controller 50 includes channel controllers 54, 56, a network adapter 58, a CPU 64, a memory 66, a shared memory 60 or 61, a cache memory 62, and a disk controller 68, and the respective components are mutually connected via an internal network (not shown), the channel controllers 54, 56 are connected to the network 20, the network adapter 58 is connected to the management network 22, and the disk controller 68 is connected to the respective storage devices 52 via an internal network (not shown).

The respective channel controllers 54, 56 include a plurality of ports, and each port is connected to a port provided to a network switch on a network via a network cable such as an optical fibre. Assigned to each port is a network address (for example, WWN or the like). The respective channel controllers 54, 56 function as a communication interface for sending and receiving commands and data (I/O data) related to I/O access to and from the servers 10, 12 that are connected via the network 20, and, upon receiving an access request from the respective servers 10, 12, execute, for example, the data read or data write control according to the access request.

Here, the respective channel controllers 54, 56 retain a data packet to be sent and received to and from the respective servers 10, 12, perform protocol conversion to the retained data packet to remove a header and the like, extracts the I/O commands and data from the data packet, and writes the extracted data in the cache memory 62. Moreover, the respective channel controllers 54, 56 refer to the cache memory 62 periodically or at a predetermined timing, fetch the I/O data to be processed by itself from the cache memory 62, and encapsulates, according to a predetermined protocol, the data written from the disk controller 68 into the cache memory 62.

The network adapter 58 functions as a management interface for sending and receiving information to and from the management server 14 via the management network 22. The CPU 64 functions as a control unit for governing the control of the overall storage apparatus 16, and functions as a control unit for controlling the I/O of data to and from the virtual volumes belonging to the storage apparatus 16. The memory 66 functions as a storage area for storing a processing program and the like to be executed by the CPU 64.

The shared memory 60 stores information related to tables such as a volume information table and a latency information table, and information related to programs such as a performance tuning program and a reallocation control program. Moreover, the shared memory 60 additionally stores system configuration information and operating information of the respective storage apparatuses 16, 18. Note that, in this Example, while the shared memory 60 of the storage apparatus 16 stores information related to all tables and programs for managing the overall storage apparatuses, the shared memory 61 of the storage apparatus 18 stores information related to tables and programs that are used only by the storage apparatus 18.

The disk controller 68 functions as an I/O interface for controlling the access to the respective storage devices 52. Here, the disk controller 68 determines the logical volume LU to be accessed based on the logical address indicated by the I/O data, and accesses the determined logical volume LU. Moreover, the disk controller 68 refers to the cache memory 62 periodically or at a predetermined timing, fetches the I/O data to be processed by itself from the cache memory 62, and sends the I/O data to the storage device 52, which is the target device of the fetched I/O data.

The disk controller 68 converts a logical address into a physical address, for example, when the I/O data is a write request, and writes the substance of the data in the storage area indicated in the converted physical address. Meanwhile, when the I/O data is a read request, the disk controller 68 converts a logical address into a physical address, and reads the substance of the data from the storage area indicated in the converted physical address, and writes the read substance into the cache memory 62. Moreover, when the logical address indicated in the I/O data is the logical address assigned to the virtual volume, address conversion is performed so that the substance of the data is written in the pool volume.

Each storage device 52 is configured, for example, from a hard disk device, a semiconductor memory device, an optical disk device, a magneto-optical disk device, a magnetic tape device, or a flexible disk device. When a hard disk device is used as the storage device 52, used may be, for example, a SCSI (Small Computer System Interface) disk, a SATA (Serial ATA) disk, an ATA (ATAttachment) disk, a SAS (Serial Attached SCSI) disk or the like. Moreover, when using a semiconductor memory device as the storage device 52, an SSD (Solid State Drive) (flash memory), a FeRAM (Ferroelectric Random Access Memory), an MRAM (Magnetoresistive Random Access Memory), a phase change memory (Ovonic Unified Memory) or the like may be used.

Moreover, the respective storage devices 52 can also be used to configure a RAID (Redundant Array of Inexpensive Disks) group; for example, RAID 4, RAID 5, or RAID 6, or the respective storage devices 52 can be divided into a plurality of RAID groups. Here, a plurality of logical units (hereinafter sometimes referred to as "LUs (Logical Units)") or a plurality of logical volumes may also be formed on a physical storage area of the respective storage devices 52.

Note that, while the allocation of three or more servers is anticipated in addition to the servers 16, 18, since the respective storage apparatuses are configured the same, in the ensuing explanation, the server 16 is mainly explained. Moreover, among the plurality of storage apparatuses, the storage apparatus 16 is explained as the representative storage apparatus. Here, the CPU 64 of the storage apparatus 16 functions as the main control unit. Moreover, while the shared memory 60 of the storage apparatus 16 stores information related to all tables and programs for managing the overall storage apparatuses, the shared memory 61 of the other storage apparatuses stores information related to tables and programs that are used only by the other storage apparatuses.

As the network 20, used may be, for example, an FCSAN (Fibre Channel Storage Area Network), an IP SAN (Internet Protocol Storage Area Network), a LAN (Local Area Network), or a WAN (Wide Area Network).

Figure 2:
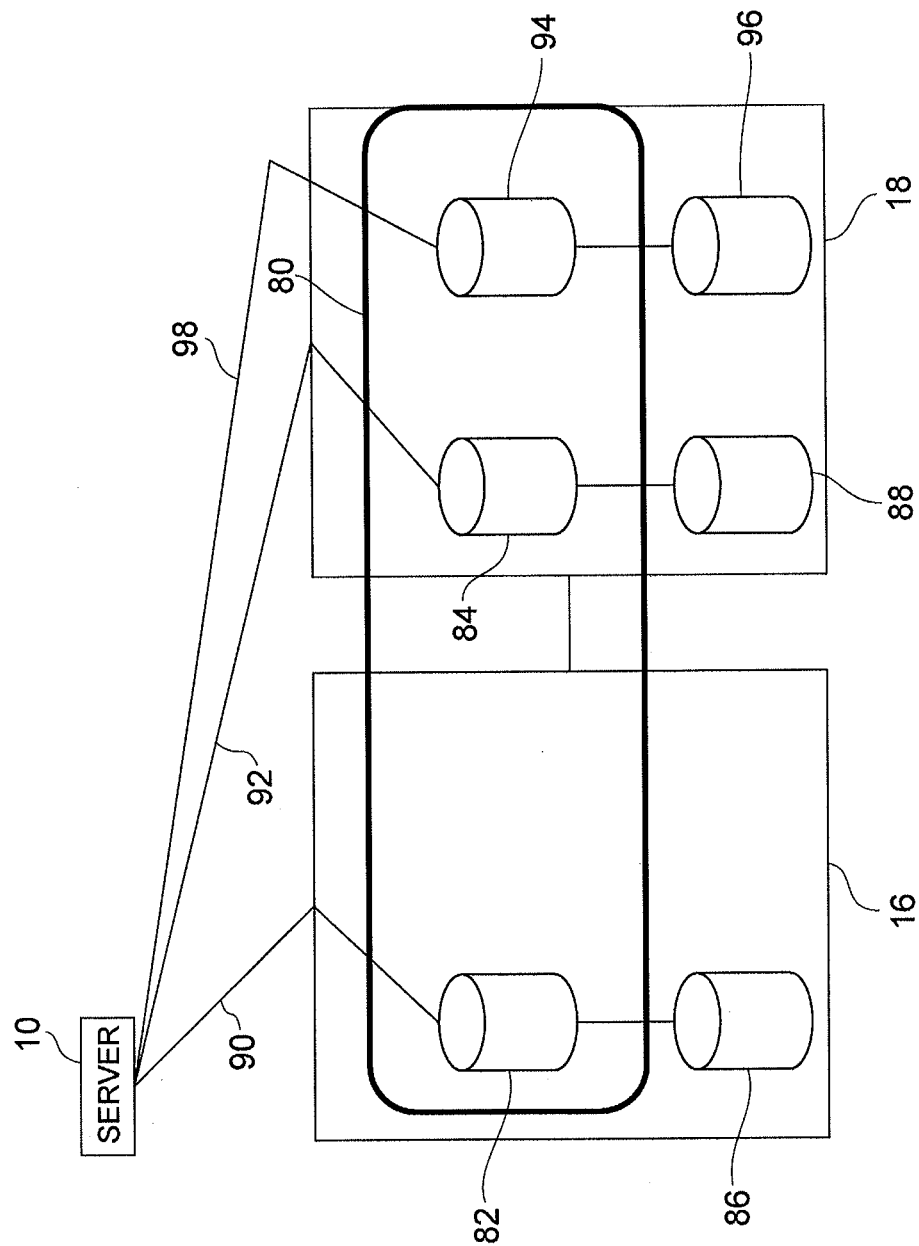
FIG. 2 is a configuration diagram explaining the LU management method.

FIG. 2 is a configuration diagram explaining the LU management method. In FIG. 2, the storage apparatus 16 and the storage apparatus 18 are logically configured as one virtual storage apparatus 80, and a plurality of logical units (LUs) or logical volumes are allocated to the virtual storage apparatus 80. For example, #1 LU (hereinafter referred to as "LU1") is configured from a virtual volume (virtual LDEV) 82 and a real volume (real LDEV) 86, and the real volume (real LDEV) 86, which is configured from the storage device 52 of the storage apparatus 16, is associated with the virtual volume 82. #2 LU (hereinafter referred to as "LU2") is configured from a virtual volume (virtual LDEV) 84 and a real volume (real LDEV 88), and the real volume (real LDEV 88), which is configured from the storage device 52 of the storage apparatus 18, is associated with the virtual volume 84.

Here, under an environment in which the server 10 and the respective storage apparatuses 16, 18 are connected via a plurality of access paths (for example, logical paths formed with an alternate path program disposed in the server 10 and paths connecting the server 10 and the respective virtual volumes in the virtual storage apparatus 80), when the virtual volume 82 is connected to the server 10 via an access path 90 and the virtual volume 84 is connected to the server 10 via an access path 92, a virtual serial number "VDKC" of the virtual volume 82 and a LUN "#01" are provided to the server 10 from the storage apparatus 16. In addition, a virtual serial number "VDKC" of the virtual server 84 and a LUN "#02" are provided to the server 10 from the storage apparatus 18. Here, when the server 10 accesses the LU1, the real volume 86 can be accessed via the virtual volume 82 by activating the access path 90, and when the server 10 accesses the LU2, the real volume 88 can be accessed via the virtual volume 84 by activating the access path 92. In other words, the server 10 can access the virtual volume to become the access target by issuing an access request with one of the virtual volumes among the plurality of virtual volumes as the access target.

Meanwhile, when the real volume 86 is associated with the virtual volume 84 in substitute for the real volume 88 being associated with the virtual volume 84, the server 10 can access the real volume 86 via the virtual volume 84 by activating the access path 92.

Moreover, when the server 10 is to configure an LU3 by associating a real volume 96, which is configured from the storage device 52 of the storage apparatus 18, with the virtual volume 94, migrate the data in the real volume 86 to the real volume 96, and thereafter access the LU3 in substitute for the LU1, the server 10 can access the real volume 96 via the virtual volume 94 by activating the access path 98. Here, for example, when the latency in the access path 90 is higher than the latency in the access path 98, the server 10 can access the data faster by migrating the data in the real volume 86 to the real volume 96 and thereafter accessing the data in the real volume 96 via the access path 98 in comparison to accessing the data in the real volume 86 via the access path 90.

In other words, when migrating an LU to be migrated to another storage apparatus, the responsiveness for accessing the LU to be migrated can be improved by selecting, as a migration destination storage apparatus, a storage apparatus with a lower latency in the access path, and allocating the LU to be migrated in the selected migration destination storage apparatus.

FIG. 3(a) is a configuration diagram of the volume I/O reception information table. In FIG. 3(a), the volume I/O reception information table 200 is stored in the shared memory 60 of the respective storage apparatuses 16, 18 as a table for managing the volumes allocated in the virtual storage apparatus 80, and is configured from a volume ID field 200A, a WWN field 200B, and an I/O history field 200C.

The volume ID (Identifier) is an identifier for identifying the volumes (LUs) allocated in the virtual storage apparatus 80. The entry of the volume ID field 200A stores, as the information of the LU, information of the "LU1" when, for example, the volume is LU1 (#1 LU).

The WWN (World Wide Name) is an identifier for identifying the port (initiator port) of the server 10 connecting the access path of the virtual volume, which is allocated in the virtual storage apparatus 80, and the server 10. The entry of the WWN field 200B stores, as the identifier for identifying the initiator port of the access path connected to the LU, for example, information of "iWWN1".

The I/O history is information indicating whether the respective storage apparatuses 16, 18 received an I/O from the server 10. In the entry of the I/O history field 200C, information of "1" is stored in correspondence with the LU when the storage apparatuses 16, 18 have respectively received an I/O from the server 10, and information of "0" is stored in correspondence with the LU when no I/O has been received from the server 10.

FIG. 3(b) is a configuration diagram of the related information table of the volume and the I/O count. In FIG. 3(b), the related information table 250 of the volume and the I/O count is stored in the shared memory 60 of the respective storage apparatuses 16, 18 as a table for managing the volumes allocated in the virtual storage apparatus 80, and is configured from a volume ID field 250A, a WWN field 250B, a random write/read I/O count field 250C, and a sequential write/read I/O count field 250D. The respective entries of the volume ID field 250A store similar information as the volume ID field 200A of FIG. 3(a), and the entry of the WWN field 250B stores similar information as the WWN field 200B of FIG. 3(a).

The random write/read I/O count is information indicating the number of times that the respective accesses were received when the respective storage apparatuses 16, 18 receive a random write access or a random read access from the server 10. The entry of the random write/read I/O count field 250C stores, as information indicating the number of times of random write access or random read access, for example, information of "50".

The sequential write/read I/O count is information indicating the number of times that the respective accesses were received when the respective storage apparatuses 16, 18 receive a sequential write access or a sequential read access from the server 10. The entry of the sequential write/read I/O count field 250D stores, as information indicating the number of times of sequential read access or sequential read access, for example, information of "25".

FIG. 3(c) is a configuration diagram of the volume management table. In FIG. 3(c), the volume management table 300 is a table that is stored in the shared memory 60 of the respective storage apparatuses 16, 18 for managing the volumes allocated in the virtual storage apparatus 80, and is configured from a volume ID field 300A, a virtual LDEV ID field 300B, and a real LDEV ID field 300C. The entry of the volume ID field 300A stores similar information as the volume ID field 200A of FIG. 3(a).

The virtual LDEV ID is an identifier for identifying the virtual volumes allocated in the virtual storage apparatus 80. The entry of the virtual LDEV ID field 300B stores, as the identifier for identifying the virtual volumes configuring the LU, for example, information of "01:01" when the LU1 is configured from the virtual volume of 01:01.

The real LDEV ID is an identifier for identifying the real volumes that are associated with the virtual volumes allocated in the virtual storage apparatus 80. The entry of the real LDEV ID field 300C stores, for example, information of "10:10" when the LU1 is configured from a virtual volume of "01:01" and "10:10" is associated as the real volume with the virtual volume of "01:01".

FIG. 4 is a configuration diagram of the related information table of the volume and the access frequency. In FIG. 4, the related information table 350 of the volume and the access frequency is a table that is stored in the shared memory 60 of the storage apparatus 16 for managing the volumes allocated in the storage apparatuses 16, 18, and is configured from a volume ID field 350A, a physical storage ID field 350B, a WWN field 350C, a random write/read I/O count field 350D, a sequential write/read I/O count 350E, an I/O characteristics field 350F, and an access frequency field 350G. The volume ID field 350A stores similar information as the volume ID field 200A of FIG. 3(a).

The physical storage ID is an identifier for identifying the storage apparatuses 16, 18. The entry of the physical storage ID field 350B stores information of "ST1" when the ID of the storage apparatus 16 is "ST1" and the LU1 is allocated in the storage apparatus 16.

The WWN field 350C stores similar information as the WWN field 200B of FIG. 3(a). The entry of the random write/read I/O count field 350D stores similar information as the random write/read I/O count field 250C of FIG. 3(b), and the entry of the sequential write/read I/O count field 350E stores similar information as the sequential write/read I/O count field 250D of FIG. 3(b).

The I/O characteristics are the I/O characteristics that are used when the server 10 performs a write access or a read access to the respective LUs. The entry of the I/O characteristics field 350F stores information of "random" when the write access or the read access to the LU is performed more randomly than sequentially. In other words, when the I/O count recorded in the random write/read I/O count field 350D is greater than the I/O count recorded in the sequential write/read I/O count field 350E, information of "Random" is stored as the I/O characteristics.

The access frequency is information indicating a sum total of both accesses when the server 10 randomly access or sequentially accesses the respective LUs. The entry of the access frequency field 350G stores the sum total of the I/O count recorded in the random write/read I/O count field 350D and the I/O count recorded in the sequential write/read I/O count field 350E. For example, when the server 10 randomly accesses or sequentially accesses the LU1, information of "75" is stored, in the access frequency field 350G, as the sum total of the I/O count=50 during random access and the I/O count=25 during sequential access.

FIG. 5 is a configuration diagram of the latency information table. In FIG. 5, the latency information table 400 is a table that is stored in the shared memory 60 of the storage apparatus 16 for managing the latency in the access path connecting the server 10 and the respective storage apparatuses 16, 18, and is configured from a WWN field 400A, a WWN field 400B, a physical storage ID field 400C, and a latency field 400D. The entry of the WWN field 400A stores similar information as the WWN field 200B of FIG. 3(a).

The entry of the WWN field 400B stores, as the identifier for identifying the target port of the server 10 connected to the path connecting the server 10 and the management server 14, for example, information of "tWWN1". The target port of the server 10 is used as a port for inputting a command from the management server 14, for example, a command for measuring the latency.

The entry of the physical storage ID field 400C stores similar information as the physical storage ID field 350B of FIG. 4.

The latency is information of the waiting time indicating a measured value (response time) of the latency in the access path connecting the server 10 and the respective storage apparatuses 16, 18. The entry of the latency field 400D stores, for example, information of "1m" when the latency in the access path, among the access paths connecting the storage apparatus 16 and the server 10, connected to the initiator port iWWN1 of the server 10 and the storage apparatus 16 (ST1) is 1 msec.

FIG. 6(a) is a configuration diagram of the related information table of the virtual storage user and the server. In FIG. 6(a), the related information table 450 of the virtual storage user and the server is a table that is stored in the shared memory 60 of the storage apparatus 16 for managing the users using the virtual storage apparatus 80, and is configured from a virtual storage user ID field 450A, and a WWN field 450B.

The virtual storage user ID is an identifier for identifying the user using the virtual storage apparatus 80. The entry of the virtual storage user ID field 450A stores, as the user name, for example, information of "Cust1".

The entry of the WWN field 450B stores information similar to the WWN field 200B of FIG. 3(a). Here, when two initiator ports are assigned as the initiator ports of the server 10 to the user, the entry of the WWN field 450B stores, for example, information of "iWWN1, iWWN 3".

FIG. 6(b) is a configuration diagram of the related information table of the virtual storage user and the maximum number of volumes. In FIG. 6(b), the related information table 500 of the virtual storage user and the maximum number of volumes is a table that is stored in the shared memory 60 of the storage apparatus 16 for managing the users using the virtual storage apparatus 80, and is configured from a virtual storage user ID field 500A, a physical storage ID field 500B, and a field of the number of the permitted maximum volume 500C.

The virtual storage user ID field 500A stores similar information as the virtual storage user ID field 450A of FIG. 6(a). The entry of the physical storage ID field 500B stores similar information as the physical storage ID field 350B of FIG. 4.

The number of the permitted maximum volume is information indicating the maximum number of volumes which is permitted to be allocated by the respective users in the respective storage apparatuses 16, 18. The entry of the field of the number of the permitted maximum volume 500C stores, as information indicating the maximum number of volumes which is permitted to be allocated in the respective storage apparatuses 16, 18, for example, information of "2".

The number of the permitted maximum volume is a value that is determined among the users when the storage apparatuses 16, 18 are operated.

Figure 7:
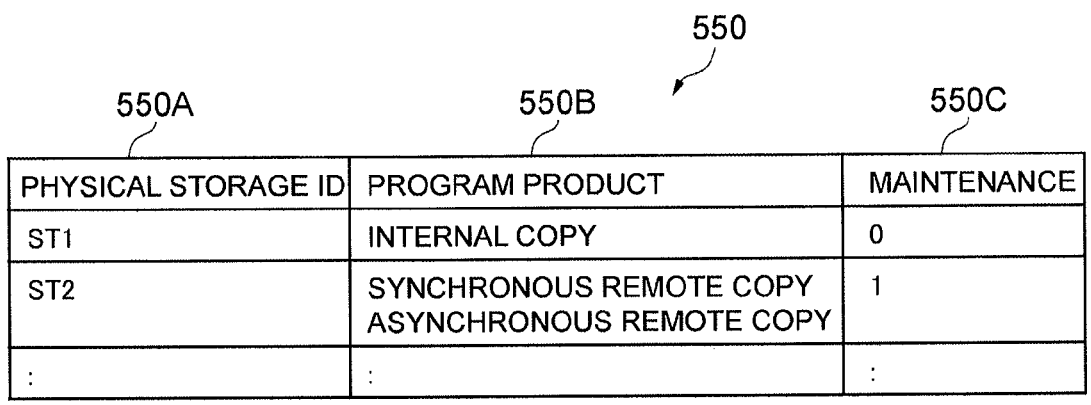
FIG. 7 is a configuration diagram of the physical storage information table.

FIG. 7 is a configuration diagram of the physical storage information table. In FIG. 7, the physical storage user information table 550 is a table that is stored in the shared memory 60 of the storage apparatus 16 for managing the storage apparatuses 16, 18, and is configured from a physical storage ID field 550A, a program product (PP) field 550B, and a maintenance field 550C.

The physical storage ID is an identifier for identifying the storage apparatuses 16, 18. The entry of the physical storage ID field 550A stores information similar to the physical storage ID field 350B of FIG. 4. Here, information related to the physical storage ID field 550A is updated when a storage apparatus is added or deleted by the management server 14.

The program product (PP) is information for identifying the software resource of the storage apparatuses 16, 18. The entry of the program product field 550B corresponding to the storage apparatus 16 stores, for example, information of "internal copy" when the storage apparatus 16 includes an internal copy program as the software resource. Moreover, when the storage apparatus 18 includes a program related to "synchronous remote copy" and "asynchronous remote copy" as the software resource, the entry of the program product 550B corresponding to the storage apparatus 18 stores information of "synchronous remote copy, asynchronous remote copy".

The maintenance is information indicating whether the storage apparatuses 16, 18 are undergoing maintenance. The entry of the maintenance field 550C stores, for example, information of "0" when the storage apparatus 16 is not undergoing maintenance, and information of "1" when the storage apparatus 18 is undergoing maintenance. This information related to maintenance is updated every predetermined period, or updated when the storage apparatus 16 receives an update command from the management server 14.

Figure 8:
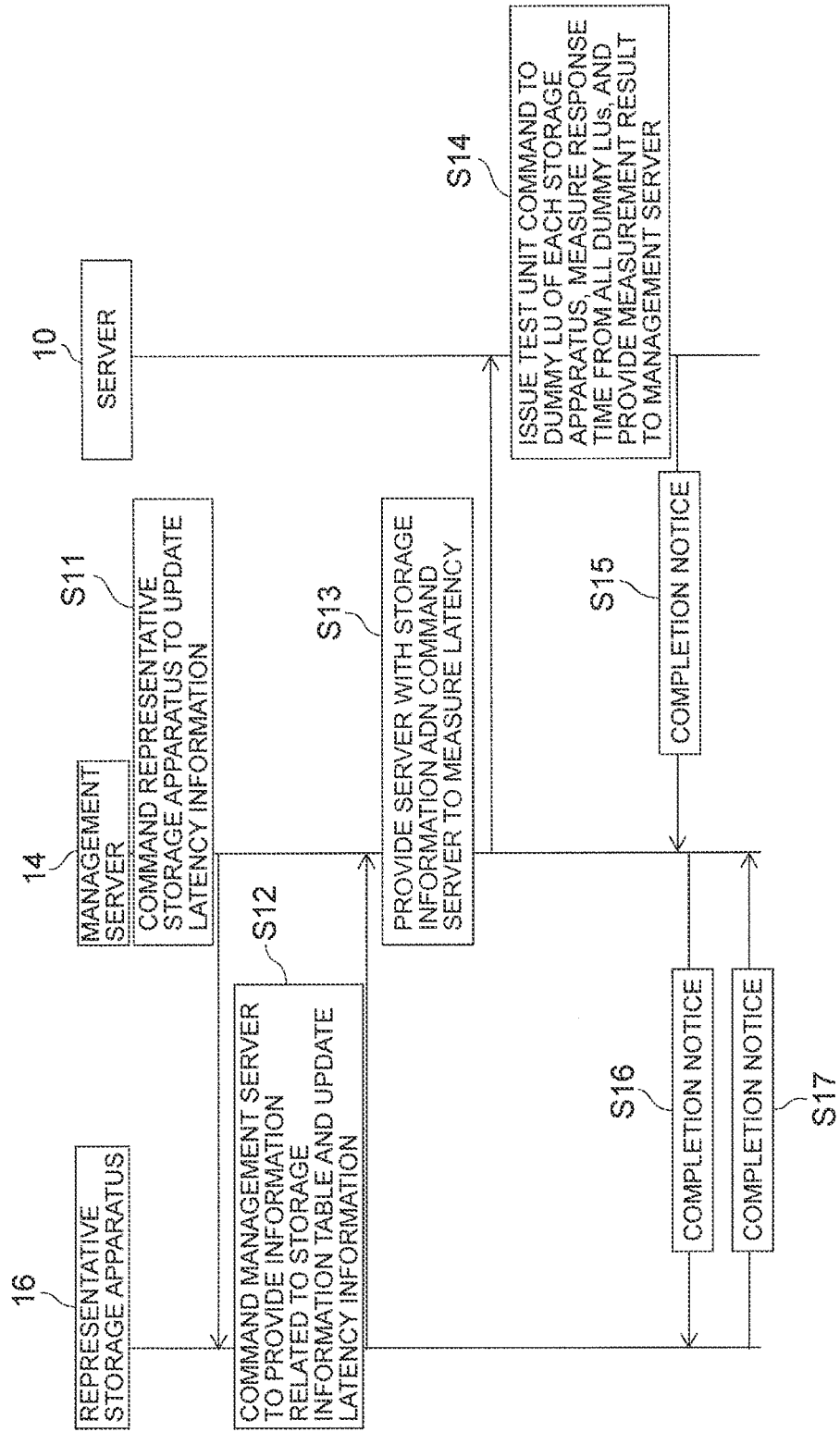
FIG. 8 is a flowchart explaining the latency measurement method.

FIG. 8 is a flowchart explaining the latency measurement method. The measurement of latency in the respective access paths connecting the server 10 and the respective storage apparatuses 16, 18 is performed, for example, when a storage apparatus is added.

Foremost, when a storage apparatus is added, the management server 14 commands the storage apparatus 16, which is the representative storage apparatus, to update the latency information table 400 (S11). When the storage controller 50 of the storage apparatus 16 receives an update command from the management server 14, the CPU 64 of the storage controller 50 provides information of the storage information table 550 to the management server 14, and commands the management server 14 to update the latency information (S12).

When the management server 14 receives an information update command from the storage controller 50, the management server 14 provides information of the storage information table 550 to the server 10, and commands the server 10 to measure the latency (S13).

The server 10 issues a test unit command to a dummy LU (latency measurement LU) of the respective storage apparatuses 16, 18 among the plurality of LUs allocated in the virtual storage apparatus 80, thereafter measures the response time from all dummy LUs, and provides the measurement result to the management server 14 (S14). Subsequently, the server 10 sends, to the management server 14, a completion notice to the effect that the latency measurement is complete (S15).

The management server 14 sends, to the storage apparatus 16, a measurement result received from the server 10, and thereafter sends, to the storage apparatus 16, a completion notice to the effect that the latency measurement is complete (S16).

The storage controller 50 of the storage apparatus 16 updates information of the latency information table 400 based on the measurement result received from the management server 14, and thereafter sends, to the management server 14, a completion notice to the effect that the update of information of the latency information table 400 is complete (S17).

Based on the foregoing processing, the latency in the respective access paths is measured, and the respective measurement results are registered in the latency information table 400.

Figure 9:
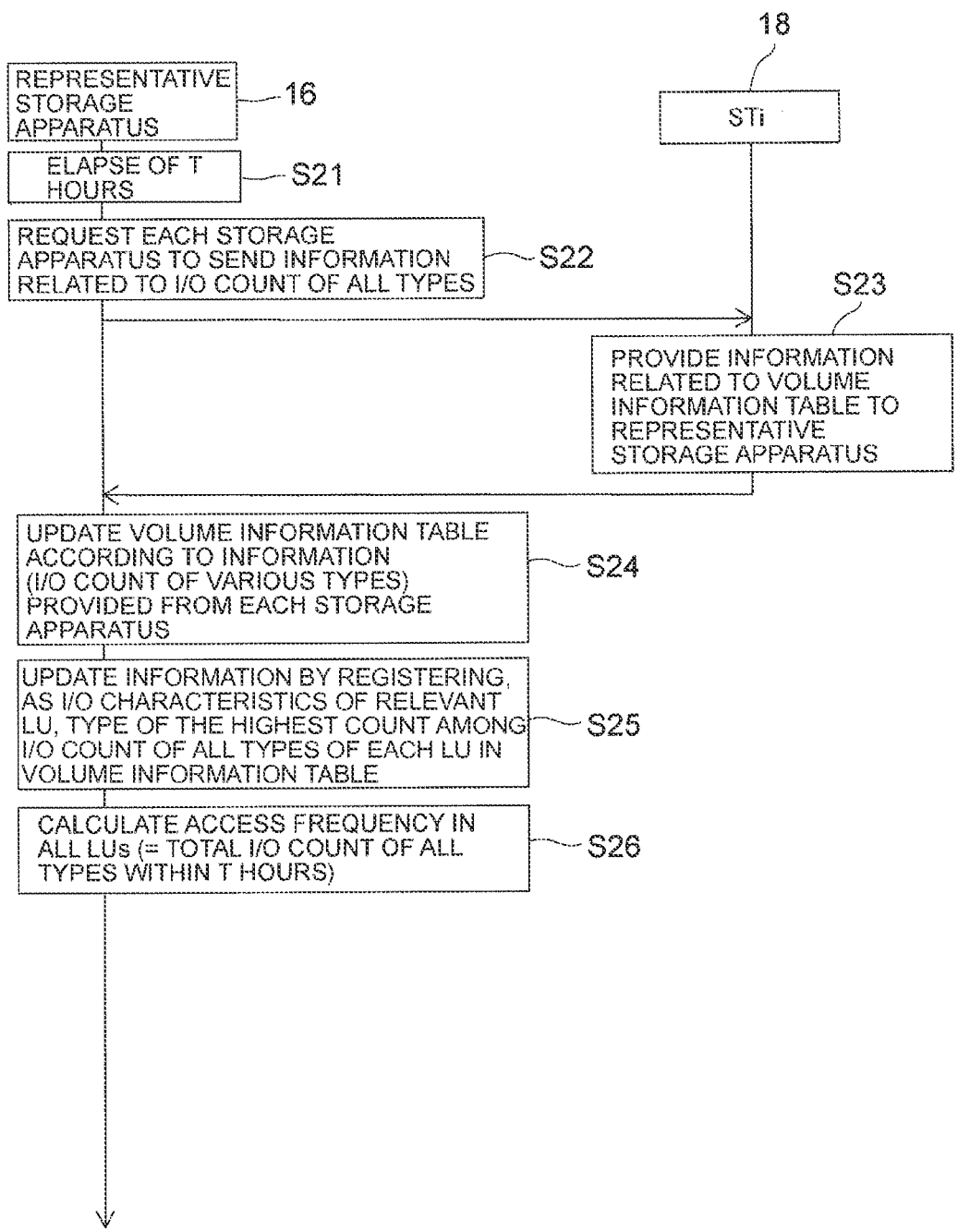
FIG. 9 is a flowchart explaining the performance tuning processing.
Figure 10:
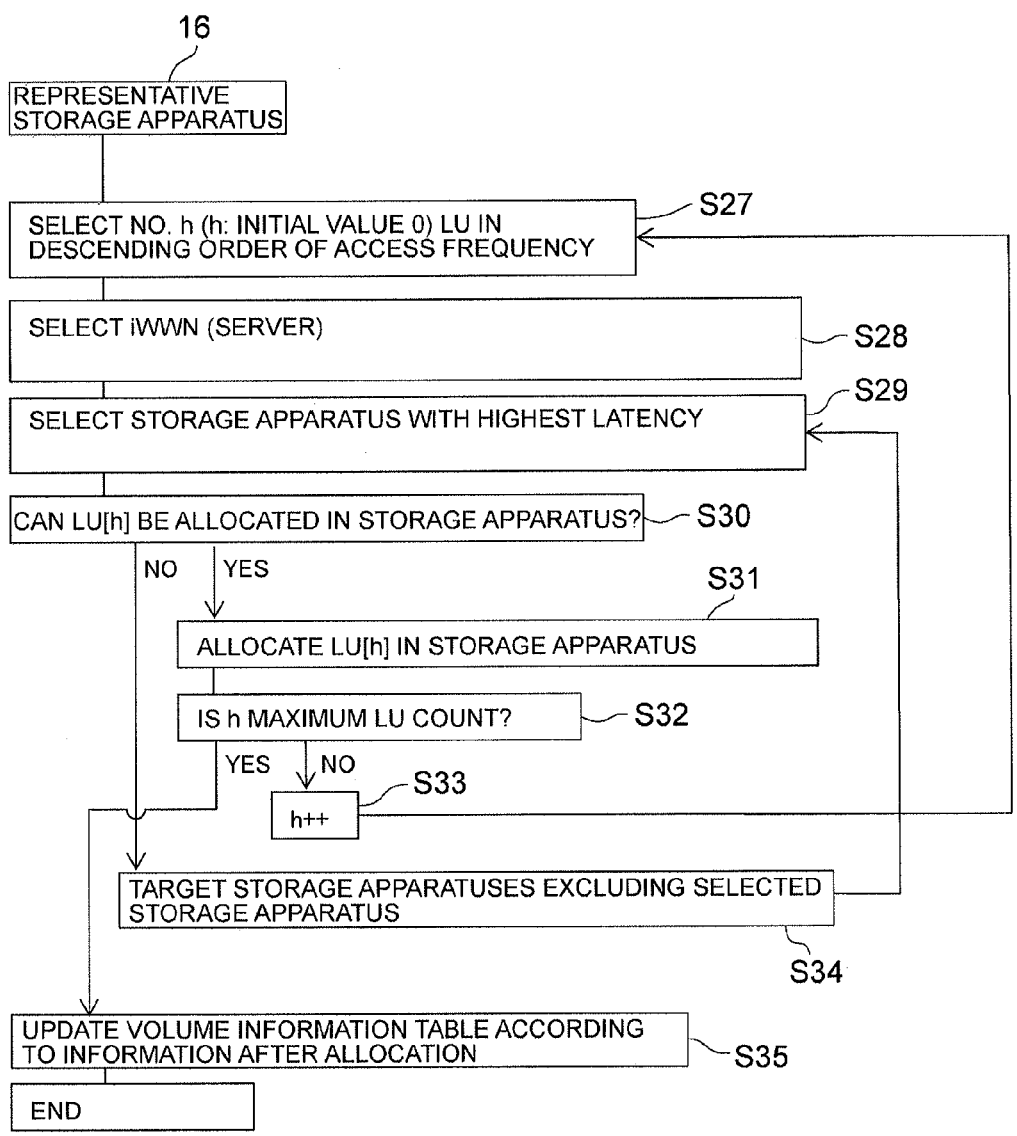
FIG. 10 is a flowchart explaining the performance tuning processing.

FIG. 9 and FIG. 10 are flowcharts explaining the performance tuning processing. This processing is started by the CPU 64 of the storage apparatus 16 activating the performance tuning program stored in the shared memory 60.

In FIG. 9, foremost, the CPU 64 of the storage controller 50 measures the time and starts the processing for each lapse of T hours (S21), and requests the respective storage apparatuses 16, 18 to send information on the I/O count of all types (I/O count including sequential access and random access) (S22). The storage controller 50 of the storage apparatus 18 provides, to the storage apparatus 16, information registered in the volume information table 250 (S23).

Subsequently, the CPU 64 of the storage apparatus 16 updates the information of the related information table 350 of the volume and the access frequency according to the information of the related information table 250 of the volume and the I/O count stored in the shared memory 60 of the storage apparatus 16, and the information provided from the storage apparatus 18 (information registered in the related information table 250 of the volume and the I/O count) (S24).

Subsequently, the CPU 64 registers, as the I/O characteristics of the respective LUs, the greater of the I/O count of all types among the information registered in the related information table 350 of the volume and the access frequency, and updates the related information table 350 of the volume and the access frequency (S25). For example, the I/O characteristics are registered as "random" when the random write/read I/O count is greater than the sequential write/read I/O count regarding a certain LU.

Subsequently, the CPU 64 calculates, as the access frequency in all LUs, the sum total of the I/O count of all types within T hours (sum total of random write/read I/O count and sequential write/read I/O count), and registers the respective calculation results in the related information table 350 of the volume and the access frequency (S26).

Subsequently, in FIG. 10, the CPU 64 selects the No. h (h: initial value 0) LU in descending order of access frequency among all LUs (S27).

When the CPU 64 selects the LU with the highest access frequency (LU with No. 1 access frequency) with h as 1, the CPU 64 refers to the related information table 350 of the volume and the access frequency, and selects the initiator port (iWWN) of the server 10 to be connected to the selected LU (S28). For example, when the LU1 is selected as the LU with the highest access frequency, "iWWN1" is selected as the initiator port of the server 10 to be connected to the LU1.

Subsequently, the CPU 64 refers to the latency information table 400 based on the selected initiator port, and selects the storage apparatus with the most superior latency among the storage apparatuses connected to the selected initiator port; that is, the storage apparatus with the smallest latency value (S29). For example, when the storage apparatus with the smallest latency value among the storage apparatuses connected to the initiator port iWWN1 is the storage apparatus 18, the storage apparatus 18 is selected.

Subsequently, the CPU 64 determines whether the LU with the highest access frequency can be allocated in the storage apparatus that was selected in step S29 (S30). In other words, the CPU 64 determines whether the migration source virtual volume to be migrated satisfies the migration condition. For example, the CPU 64 determines whether the LU1 can be allocated in the storage apparatus 18 to become the migration destination. Here, the CPU 64 refers to the related information table 500 of the virtual storage user and the maximum number of volumes, and determines whether the number of the permitted maximum volume, which is permitted to the user, will be exceeded, when the LU1 is allocated in the storage apparatus 18. In other words, the CPU 64 determines that the LU1 can be allocated in the storage apparatus 18 if the number of the permitted maximum volume will not be exceeded even when the LU1 is newly allocated in the storage apparatus 18, and determines that the LU1 cannot be allocated in the storage apparatus 18 if the number of permitted maximum volume will be exceeded when the LU1 is newly allocated in the storage apparatus 18.

Moreover, the CPU 64 refers to information of the program product field 550B of the physical storage information table 550, and determines, with regard to the LU that was selected as the LU with the highest access frequency, whether the software resource applied in the storage apparatus 16 can also be applied in the storage apparatus 18 to become the allocation destination. For example, the CPU 64 determines that the LU1 can be allocated in the storage apparatus 18 when the software resource applied to the selected LU1 is also installed in the storage apparatus 18 of the allocation destination, and determines that the LU1 cannot be allocated in the storage apparatus 18 when the software resource applied in the selected LU1 is not installed in the storage apparatus 18 of the allocation destination.

In addition, the CPU 64 refers to information of the maintenance field 550C of the physical storage information table 550, and determines whether the storage apparatus to become the allocation destination of the selected LU is undergoing maintenance. For example, the CPU 64 determines that the LU1 can be allocated in the storage apparatus 18 when the storage apparatus 18 to become the allocation destination of the LU1 is not undergoing maintenance, and determines that the LU1 cannot be allocated in the storage apparatus 18 when the storage apparatus 18 to become the allocation destination of the LU1 is undergoing maintenance.

When a positive determination result is obtained in step S30, the CPU 64 executes processing for allocating the LU, which was selected in step S27, in the storage apparatus selected in step S29 (S31), and determines whether h is the maximum number of LUs (S32).

When a negative determination result is obtained in step S32, the CPU 64 increments the value of h by one when h is not the maximum number of LUs (S33), proceeds to the processing of step S27, and selects the LU with the second highest access frequency. In step S27, the CPU 64 thereafter sequentially selects the LU with the third highest access frequency, . . . , and repeats the processing of steps S27 to S33 until h becomes the maximum number of LUs with regard to the selected LU.

Meanwhile, when a negative determination result is obtained in step S30; that is, when the selected LU cannot be allocated in the storage apparatus selected in step S29, the CPU 64 targets a storage apparatus other than the storage apparatus selected in step S29 (S34), proceeds to the processing of step S29, and repeats the processing of steps S29 to S34.

Meanwhile, when a positive determination result is obtained in step S32; that is, when h reaches the maximum number of LUs, or when the processing of all LUs is ended, the CPU 64 registers, in the volume information table 350, information after the LU selected in step S27 is allocated in the storage apparatus selected in step S29, updates the related information table 350 of the volume and the access frequency (S35), and ends the processing in this routine.

In this Example, the CPU 64 of the storage apparatus 16 selects the migration source virtual volume to be migrated among the plurality of virtual volumes in the virtual storage apparatus 80, and functions as the main control unit for managing the selected migration source virtual volume. Here, when there is a measured value that is smaller than the measured value (first measured value) indicating the latency in the access path connecting the server 10 and the storage apparatus 16 and which is the measured value (second measured value) indicating the latency in the access path connecting the server 10 and the storage apparatus 18 among the measured values of the server 10, the CPU 64 selects, as the migration destination storage apparatus, the storage apparatus 18 connected to the access path indicating the latency of the smallest second measured value among the second measured values.

Subsequently, the CPU 64 migrates data of the migration source logical volume (real LDEV), which is assigned to the migration source virtual volume, to the migration destination logical volume (real LDEV), which is assigned to the migration destination virtual volume allocated in the storage apparatus 18, and provides the migration destination virtual volume, as the new access target, to the server 10.

Moreover, when there are one or more storage apparatuses other than the storage apparatuses 16, 18, the CPU 64 compares, among the measured values of the server 10, a first access path indicating the latency in a first access path connecting the migration source storage apparatus (16), which includes the migration source virtual volume, and the server 10, and one or more second measured values indicating the latency in one or more second access paths connecting one or more other storage apparatuses (18 and other storage apparatuses), which are different from the migration source storage apparatus (16), and the server 10, and, when there is a second measured value that is smaller than the first measured value among the second measured values, selects, as the migration destination storage apparatus, one storage apparatus among the one or more storage apparatuses connected to the second access path indicating the latency of the second measured value that is smaller than the first measured value, and, when the selected migration source virtual volume satisfies the migration condition, allocates the migration destination virtual volume, which is to become the migration destination of the selected migration source virtual volume, in the selected migration destination storage apparatus.

Moreover, the CPU 64 selects, among the plurality of access paths connecting the storage apparatus 16 and the server 10, access paths in descending order of measured values of the access frequency in the respective access paths, sequentially selects a virtual volume to be connected to the selected access path among the plurality of virtual volumes, and manages the sequentially selected virtual volume as the migration source virtual volume.

Note that, upon re-allocating the LU to the storage apparatus, the CPU 64 activates the reallocation control program stored in the shared memory 60.

According to this Example, since the storage apparatus 18 connected to the access path indicating a latency that is smaller than the latency in the access path connected to the LU (virtual volume) of the migration source is selected as the migration destination storage apparatus, and the migration destination LU (virtual volume) is allocated in the migration destination storage apparatus 18, the access performance of the server 10 to the access target (migration destination LU) can be improved. Moreover, the allocation of LUs (virtual volumes) can be optimized. In addition, since the LU (virtual volume) to be migrated can be selected in descending order of access frequency, processing can be performed in order from the LU (virtual volume) with the highest load, and allocation of the LUs (virtual volumes) can be efficiently optimized.

Example 2

The second Example of the present invention is now explained with reference to the drawings. In this Example, in substitute for managing the allocation of LUs based on the access frequency and latency, a combination of a plurality of LUs is selected based on the I/O load potential in the respective access paths, and the optimal allocation of the combination of selected LUs is determined. Since the hardware configuration in this Example is similar to the first Example, the software configuration is mainly explained in this Example.

FIG. 11(*a*) is a configuration diagram of the volume related information table in this Example. In FIG. 11(*a*), the volume related information table 600 is a table that is stored in the shared memory 60 of the storage apparatus 16 for managing the volumes disposed in the virtual storage apparatus 80, and is configured from a volume ID field 600A, a physical storage ID field 600B, a WWN field 600C, a random write/read I/O count field 600D, and a sequential write/read I/O count field 600E. The volume ID field 600A to the sequential write/read I/O count field 600E are information similar to the volume ID field 350A to the sequential write/read I/O count field 350E of FIG. 4.

FIG. 11(*b*) is a configuration diagram of the related information table of the volume and the I/O load potential in this Example. In FIG. 11(*b*), the related information table 700 of the volume and the I/O load potential is a table that is stored in the shared memory 60 of the storage apparatus 16 for managing the volumes allocated in the storage apparatuses 16, 18, and is configured from a volume ID field 700A, a WWN field 700B, a physical storage ID field 700C, and an I/O load potential field 700D.

The volume ID field 700A is information similar to the volume ID field 200A of the volume I/O reception information table 200 shown in FIG. 3(*a*). The WWN field 700B is information similar to the WWN field 200B of the volume I/O reception information table 200 shown in FIG. 3(*a*). The physical storage ID field 700C is information similar to the physical storage ID field 500B of the related information table 500 of the virtual storage user and the maximum number of volumes of FIG. 6(*b*).

The I/O load potential is a measured value of the I/O load potential measured based on the latency in the respective access paths. The I/O load potential is defined according to the following formula.

$$I/O \text{ load potential} = (\text{random write/read } I/O \text{ count}) \times (\text{latency from initiator port of random system } I/O \text{ to storage apparatus}) + (\text{sequential write/read } I/O \text{ count}) \times (\text{latency from initiator port of sequential system } I/O \text{ to storage apparatus})$$

The random write/read I/O count is an I/O count during a random access including a random write access and a random read access, and the sequential write/read I/O count is an I/O count during a sequential access including a sequential write access and a sequential read access.

Here, for example, the I/O load potential when the LU1 is allocated in the storage apparatus 16 (ST1) is registered in the first entry of the related information table 700 of the volume and the I/O load potential. In the foregoing case, I/O load potential=50×1 m+25×7 m=225 (msec).

The I/O load potential when the LU1 is allocated in the storage apparatus 18 (ST2) is registered in the second entry of the related information table 700 of the volume and the I/O load potential. In the foregoing case, I/O load potential=50×10 m+25×8 m=700 (msec).

The I/O load potential when the LU2 is allocated in the storage apparatus 16 (ST1) is registered in the third entry of the related information table 700 of the volume and the I/O load potential. In the foregoing case, I/O load potential=10×1 m+25×7 m=185 (msec).

The I/O load potential when the LU2 is allocated in the storage apparatus 18 (ST2) is registered in the fourth entry of the related information table 700 of the volume and the I/O load potential. In the foregoing case, I/O load potential=10×10 m+25×8 m=300 (msec).

FIG. 12 is a configuration diagram of the latency statistical information table in this Example. In FIG. 12, the latency statistical information table 800 is a table that is stored in the shared memory 60 of the storage apparatus 16 for managing the latency in the respective access paths, and is configured from a WWN field 800A, a WWN field 800B, a physical storage ID field 800C, a latency measurement condition field 800D, and a latency field 800E. The WWN field 800A to the storage ID field 800C are information similar to the WWN field 400A to the storage ID field 400C of the latency information table 400 shown in FIG. 5. The latency measurement condition is information indicating whether "random" or "sequential" was used as the I/O when the server 10 measured the latency in the access path connecting the server 10 and the respective storage apparatuses 16, 18. When the server 10 uses "random" as the I/O upon measuring the latency, the entry of the latency measurement condition field 800D stores the information of "random". The latency field 800E is information similar to the latency field 400D of the latency information table 400 of FIG. 5.

Figure 13:
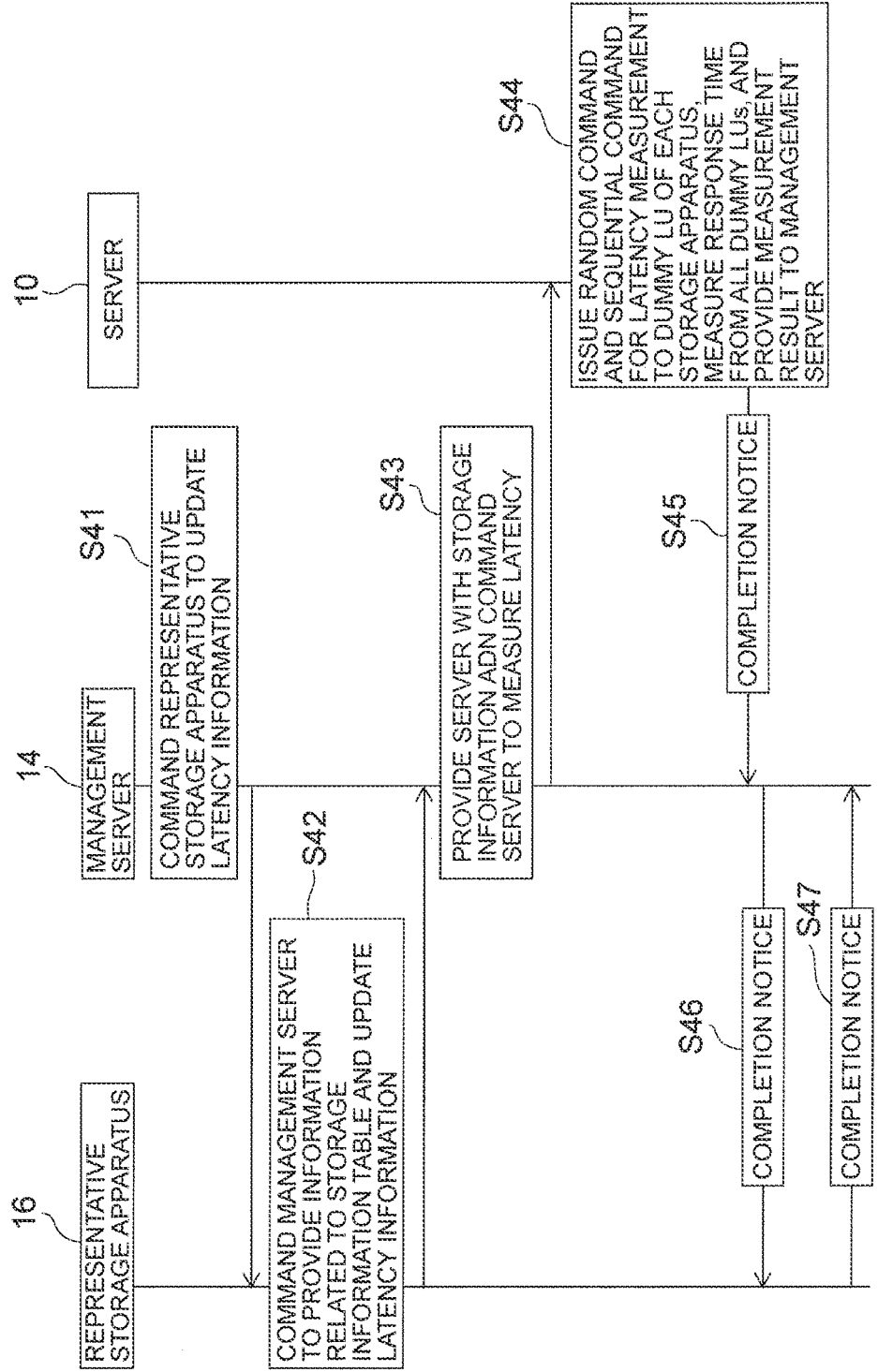
FIG. 13 is a flowchart explaining the latency measurement method according to the second Example.

FIG. 13 is a flowchart explaining the latency measurement method in this Example. Measurement of the latency in the respective access paths connecting the server 10 and the respective storage apparatuses 16, 18 is performed, for example, when a storage apparatus is increased.

Foremost, when a storage apparatus is added, the management server 14 commands the storage apparatus 16, which is the representative storage apparatus, to update the latency statistical information table 800 (S41). When the storage controller 50 of the storage apparatus 16 receives an update command from the management server 14, the CPU 64 of the storage controller 50 provides information of the storage information table 550 to the management server 14, and commands the management server 14 to update the latency information (S42).

When the management server 14 receives an information command from the storage controller 50, the management server 14 provides the server 10 with information of the physical storage information table 550, and commands the server 10 to measure the latency (S43).

The server 10 issues a latency measurement random command and a latency measurement sequential command, respectively, to the dummy LU (latency measurement LU) of the respective storage apparatuses 16, 18 among the plurality of LUs allocated in the virtual storage apparatus 80, and thereafter measures, for each command, the response time from all dummy LUs, and provides the respective measurement results to the management server 14 (S44). Subsequently, the server 10 sends, to the management server 14, a completion notice to the effect that the latency measurement is complete (S45).

The management server 14 sends, to the storage apparatus 16, a measurement result received from the server 10, and thereafter sends, to the storage apparatus 16, a completion notice to the effect that the latency measurement is complete (S46).

The storage controller 50 of the storage apparatus 16 updates information of the latency statistical information table 800 based on the measurement result received from the management server 14, and thereafter sends, to the management server 14, a completion notice to the effect that the update of information of the latency statistical information table 800 is complete (S47).

Based on the foregoing processing, the latency in the respective access paths is measured, and the respective measurement results are registered in the latency statistical information table 800.

Figure 14:
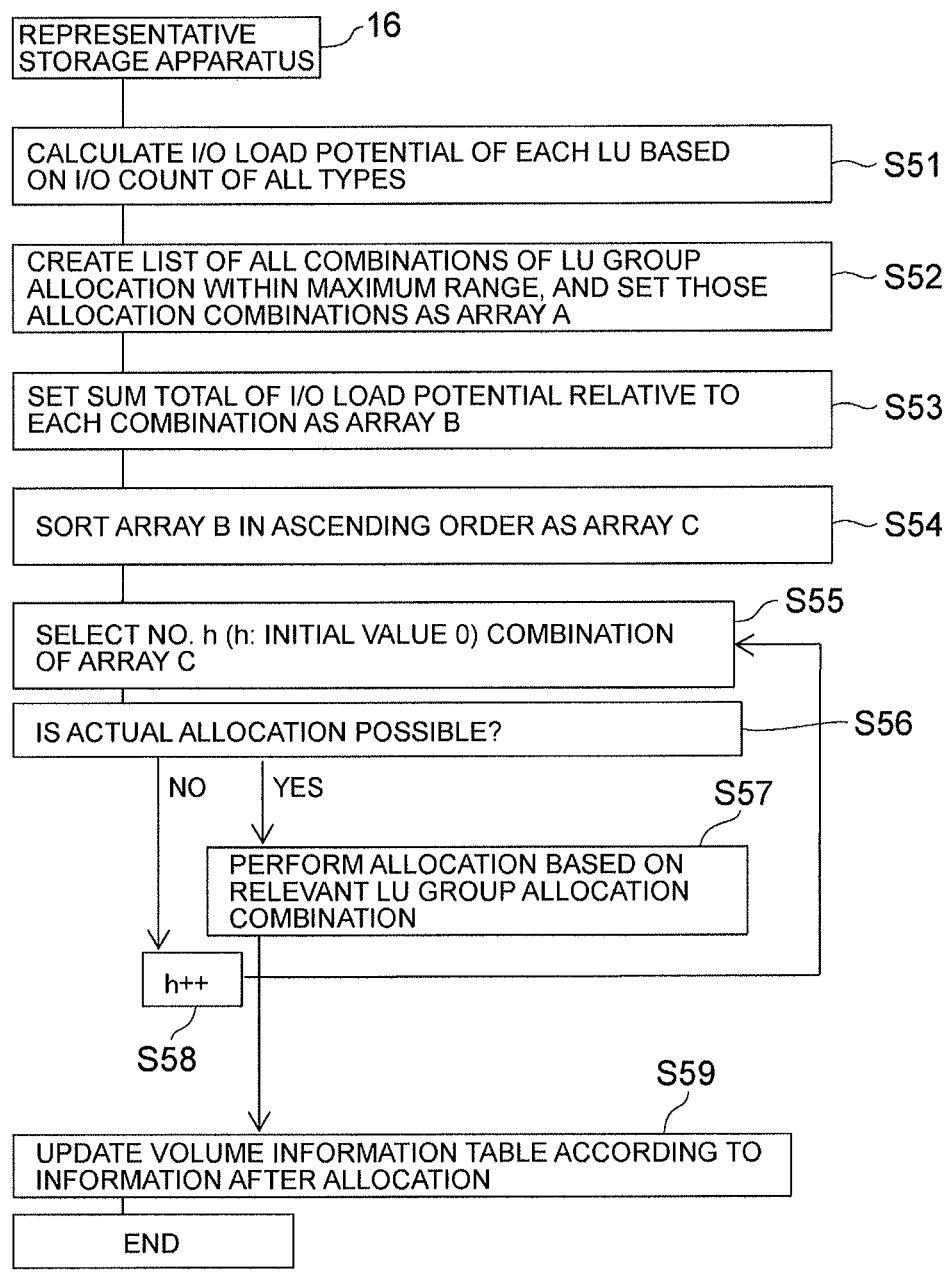
FIG. 14 is a flowchart explaining the performance tuning processing according to the second Example.

FIG. 14 is a flowchart explaining the performance tuning processing in this Example. This processing is started by the CPU 64 of the storage apparatus 16 activating the performance tuning program stored in the shared memory 60.

Foremost, the CPU 64 refers to the volume related information table 600 and the latency statistical information table 800, calculates the I/O load potential of all LUs existing in the virtual storage apparatus 80 (S51), retains the respective calculation results, refers to the related information table 500 of the virtual storage user and the maximum number of volumes, makes a list of all combinations of allocations of LUs within the range of the number of the permitted maximum volume that is permitted regarding the respective users, and retains the listed combinations of allocations as an array A (S52). For example, when the LU1 and the LU2 can be respectively allocated in the storage apparatuses 16, 18 within the range of the number of the permitted maximum volume, the CPU 64 retains a configuration of allocating the LU1 in the storage apparatus 16 and allocating the LU2 in the storage apparatus 18 as the array A[0], and allocating the LU1 in the storage apparatus 18 and allocating the LU2 in the storage apparatus 16 as the array A[1].

Subsequently, the CPU 64 calculates the sum total of the I/O load potential of the respective combinations, and retains an array B according to the respective calculation results (S53). For example, the CPU 64 retains, as the array B[0], the sum total=525 of the I/O load potential=225 when the LU1 is allocated in the storage apparatus 16 and the I/O load potential=300 when the LU2 is allocated in the storage apparatus 18. Moreover, the CPU 64 retains, as the array B[1], the sum total=885 of the I/O load potential=700 when the LU2 is allocated in the storage apparatus 16 and the I/O load potential=185 when the LU1 is allocated in the storage apparatus 18.

Subsequently, the CPU 64 sorts the array B[ ] in ascending order and retains the sorted array B[ ] as the array C[ ] (S54). For example, the CPU 64 retains the value of the array B[0] as the array C[0] when the array B[0] is the smallest array, and retains the value of the array B[1] as the array C[1] when the array B[1] is the second smallest array.

Subsequently, the CPU 64 selects the smallest array C[ ] among the array C[ ] (S55). For example, the CPU 64 selects, as the smallest array, the array C[0] among the array C[ ] when the value of the array C[0] is smallest.

Subsequently, the CPU 64 determines whether the combination of LUs of the selected array C[ ] can actually be allocated in the storage apparatus (S56). In other words, the CPU 64 determines whether the combination of LUs of the selected array C[ ] satisfies the allocation condition of the combination. Here, the CPU 64, for example, refers to information of the program product field 550B of the physical storage information table 550, and determines whether the software resource applied in the respective storage apparatuses 16, 18 can also be applied in the storage apparatuses 16, 18 to become the new allocation destination with regard to the combination of LUs of the selected array C[ ].

Here, the CPU 64 determines that the combination of LUs of the selected array C[ ] can be allocated in the storage apparatus of the new allocation destination when the software resource applied in the respective LUs is also installed in the storage apparatus of the new allocation destination with regard to the combination of LUs of the selected array C[ ], and determines that the combination of LUs of the selected array C[ ] cannot be allocated in the storage apparatus of the new allocation destination when the software resource applied in the respective LUs is not installed in the storage apparatus of the new allocation destination with regard to the combination of LUs of the selected array C[ ].

Moreover, the CPU 64 refers to information of the maintenance field 550C of the physical storage information table 550, and determines, with regard to the combination of LUs of the selected array C[ ], whether the storage apparatus to become the new allocation destination of the respective LUs is undergoing maintenance. Here, the CPU 64 determines, for example, that the combination of LUs of the selected array C[ ] can be allocated in the storage apparatus of the new allocation destination when the storage apparatus to become the new allocation destination of the respective LUs is not undergoing maintenance with regard to the combination of LUs of the selected array C[ ], and determines that the combination of LUs of the selected array C[ ] cannot be allocated in the storage apparatus of the new allocation destination when the storage apparatus to become the new allocation destination of the respective LUs is undergoing maintenance with regard to the combination of LUs of the selected array C[ ].

Subsequently, upon obtaining a positive determination result in step 56, the CPU 64 executes processing for allocating the respective LUs in the respective storage apparatuses based on the combination of LUs configuring the array C[ ] selected in step S55 (S57). For example, the CPU 64 executes processing for allocating the LU1 in the storage apparatus 16, and allocating the LU2 in the storage apparatus 18. Here, the CPU 64 activates the reallocation control program, allocates the respective LUs in the storage apparatus 16 or the storage apparatus 18, and proceeds to the processing of step 59.

Meanwhile, when a negative determination result is obtained in step S56, the CPU 64 increments the value of h by one (S58), returns to the processing of step S55, and repeats the processing of steps S55 to S58.

The CPU 64, in step S59, registers the information after the allocation of the respective LUs in the related information table 700 of the volume and the I/O load potential, updates the related information table 700 of the volume and the I/O load potential, and ends the processing in this routine.

Upon managing the allocation of the LUs, when the number of LUs to be managed is N-number of LUs and there are M-number of allocation destination storage apparatuses (ST), the configuration of disposing a maximum of $n_i$-number of LUs is defined ($N=n_1+n_2+ \ldots +n_M$). Subsequently, all combinations upon allocating the $LU_i$ in the storage apparatus $ST_j$ are obtained ($i=\{1, 2, \ldots, N\}$, $j=\{1, 2, \ldots, M\}$/number of allocation combinations $L=N!/(n_1!*n_2!* \ldots *n_M!)$). Subsequently, in the respective combinations, the sum total of the I/O load potential of the respective LUs is calculated. The combination in which the calculated sum total becomes smallest is the allocation to be obtained.

Specifically, N×L array A[ ] are prepared.

A[0]: =$\{LU_1, LU_2, \ldots LUN\}$ (in the foregoing case, for example, this means that the initial $n_1$-number of LUs are allocated in $ST_1$).

The array A[i] with the rearranged A[0] (those sorted so that they will not be the same as the existing ones) is checked as follows.

The array A[i] is separated from the top for each $n_1$-number LUs, $n_2$-number LUs, $\ldots n_M$-number LUs, and whether a case of similarly separating all other existing A[j] and the respective aggregates of A[i] are the same is checked. When there is even one same aggregate, A[i] is excluded, and a[i] (excluded array group) is stored. When all aggregates are not the same, array A[i] is stored as the target. When N×L array A is complete, the sum total of the I/O load potential of the respective combinations is calculated as follows.

Foremost, the functions are defined.

$r_n$ ($LU_X$): Current random system I/O count of $LU_X$ is obtained.

$S_n$ ($LU_X$): Current sequential system I/O count of $LU_X$ is obtained.

$r_l$ ($LU_X$, $ST_y$): Latency of random system I/O of $LU_X$ and $ST_y$ is obtained.

$S_l$ ($LU_X$, $ST_y$): Latency of sequential system I/O of $LU_X$ and $ST_y$ is obtained.

ST ($LU_X$): Storage apparatus $ST_y$ in which $LU_X$ is allocated is obtained.

P ($LU_X$, $ST_y$): I/O load potential when $LU_X$ is stored in $ST_y$ is obtained.

(P ($LU_X$, $ST_y$)=$r_n$ ($LU_X$)×$r_l$ ($LU_X$, $ST_y$)+$S_n$ ($LU_X$) ($LU_X$, $ST_y$))

Sum total of I/O load potential of respective combinations of A[ ] is set as array B[ ]. B[ ] is sorted in ascending order, and smallest combination allocation is obtained. $B[i]=\Sigma_{i=0}^{i=N} P (LU_i, ST_{ST(LUi)})$ In this Example, the CPU 64 of the storage apparatus 16 selects a plurality of combinations to become the processing target among a combination group of LUs (virtual volumes) that are formed on an assumption that the plurality of LUs (including virtual volumes) will be distributed and allocated in the respective storage apparatuses 16, 18, calculates a load potential of the respective LUs (virtual volumes) belonging to the plurality of combinations to become the processing target based on the respective measured values indicating a latency in the respective access paths connecting the respective storage apparatuses 16, 18, which include the plurality of combinations to become the selected processing target, and the server, calculates a sum total of the load potential for each combination to become the processing target based on each of the calculation values, selects a combination in which the calculated value becomes smallest among the plurality of combinations to become the processing target, and, when an allocation condition of the selected combination is satisfied, allocates the respective LUs (virtual volumes) belonging to the selected combination with one of the storage apparatuses as an allocation destination.

Here, the CPU 64 provides the respective virtual volumes allocated in the respective storage apparatuses 16, 18, as the new access target, to the server 10. Moreover, when there is a combination to be re-allocated among the plurality of combinations to become the processing target, the CPU 64 compares a first calculated value indicating the sum total of the load potential of the respective LUs (virtual volumes) belonging to an original combination (for example, combination of allocating LU1 in ST1 and allocating LU2 in ST2) of the combination to be re-allocated, and one or more second calculated values indicating the sum total of the load potential of the respective LUs (virtual volumes) belonging to another combination (for example, combination of allocating LU1 in ST2 and allocating LU2 in ST1) that is different from the original combination of the combination to be re-allocated, and, when there is a second calculated value that is smaller than the first calculated value among the second calculated values, selects a combination, which will result in a minimum value among the second calculated values, of the other different combination, and re-allocates the respective LUs (virtual volumes) belonging to the selected other different combination to one of the storage apparatuses.

According to this Example, since the respective LUs (virtual volumes) belonging to the combination in which the sum total of the load potential is smallest are respectively distributed and allocated in the storage apparatuses 16, 18, even when the access by the server 10 is a random access or a sequential access, the access performance of the server 10 to the respective access targets (LUs) can be improved. Moreover, since the respective LUs (virtual volumes) belonging to the combination in which the sum total of the load potential is smallest are respectively distributed and allocated in the storage apparatuses 16, 18, the allocation of the respective LUs (virtual volumes) can be optimized.

Note that the present invention is not limited to the foregoing Examples, and includes various modified examples. For example, the functions of the CPU 30 of the management server 14 (function of commanding the server 10 to measure the latency and other functions) may also be added to the CPU 64 of the respective storage apparatuses 16, 18. Moreover, the respective Examples were explained in detail in order to facilitate the understanding of the present invention, and the present invention is not necessarily limited to those comprising all explained configurations. Moreover, a part of the configuration of a certain Example can also be replaced with a configuration of another Example, and, in addition, the configuration of a certain Example can be added to the configuration of another Example. Moreover, a part of the configuration of the respective Examples can be added to, deleted from, or replaced with another configuration.

Moreover, each of the foregoing configurations, functions, control units and the like may also be realized, in part or in whole, for example, with hardware by designing an integrated circuit. Moreover, the respective configurations, functions and the like may also be realized with software by the processor interpreting and executing programs for realizing the respective functions. Information of programs, tables, files and the like for realizing the respective functions may be recorded in a memory, a recording device such as a hard disk or an SSD (Solid State Drive), or a recording medium such as an IC (Integrated Circuit) card, an SD (Secure Digital) memory card, a DVD (Digital Versatile Disc), or the like.

REFERENCE SIGNS LIST 10, 12 server, 14 management server, 16, 18 storage apparatus, 20 network, 22 management network, 50 storage controller, 52 storage device, 54, 56 channel controller, 58 network adapter, 60 shared memory, 62 cache memory, 64 CPU, 66 memory, 68 disk controller.

The invention claimed is:

1. A computer system, comprising:
a plurality of storage apparatuses including a plurality of virtual volumes to which one or more logical volumes built in a storage area of a plurality of storage devices are assigned; and
a server that is connected to the plurality of storage apparatuses via a network, and issues an access request with a virtual volume belonging to one of the storage apparatuses among the plurality of virtual volumes as an access target,
wherein the server includes a measurement unit for measuring a latency in a plurality of access paths connecting each of the storage apparatuses and the server;
wherein each of the storage apparatuses includes a control unit for controlling I/O of data to and from a virtual volume belonging to each of the storage apparatuses and measuring access frequency in the plurality of access paths connecting each of the storage apparatuses and the server; and
wherein among control units, each of which belongs to each of the storage apparatuses, a main control unit, which selects a migration source virtual volume to be migrated among the plurality of virtual volumes and manages the selected migration source virtual volume, fetches measured values of the access frequency from each of the control units, selects an access path in descending order of the measured values of the access frequency in each of a plurality of access paths connecting a migration source storage apparatus and the server from among the plurality of access paths, sequentially selects a virtual volume to be connected to the selected access paths from among the plurality of virtual volumes, and manages the sequentially selected virtual volume as the migration source virtual volume; and
wherein the main control unit: compares, among measured values of the measurement unit, a first measured value indicating a latency in a first access path connecting the migration source storage apparatus, in which the migration source virtual volume exists, and the server, with one or more second measured values indicating a latency in one or more second access paths connecting one or more other storage apparatuses, which are different from the migration source storage apparatus, and the server; when there is a second measured value that is smaller than the first measured value among the second measured values, the main control unit selects, as a migration destination storage apparatus, a storage apparatus connected to a second access path indicating a latency of a smallest second measured value among the second measured values; and when a migration condition of the selected migration source virtual volume is satisfied, the main control unit allocates a migration destination virtual volume, which is to become a migration destination of the selected migration source virtual volume, in the selected migration destination storage apparatus.

2. The computer system according to claim 1, wherein the main control unit migrates data of a migration source logical volume assigned to the migration source virtual volume to a migration destination logical volume assigned to the migration destination virtual volume, and provides the migration destination virtual volume as a new access target to the server.

3. The computer system according to claim 1, wherein the migration condition of the selected migration source virtual volume is that a total number of virtual volumes that were allocated in the migration destination storage apparatus upon migrating the selected migration source virtual volume to the selected migration destination storage apparatus is not greater than a permitted maximum number of volumes set in the migration destination storage apparatus.

4. The computer system according to claim 1, wherein the migration condition of the selected migration source virtual volume is that a software resource that is applied in the migration source storage apparatus with regard to the selected migration source virtual volume can also be applied in the migration destination storage apparatus.

5. The computer system according to claim 1, wherein the migration condition of the selected migration source virtual volume is that the migration destination storage apparatus is not undergoing maintenance.

6. A computer system, comprising:
a plurality of storage apparatuses including a plurality of virtual volumes to which one or more logical volumes built in a storage area of a plurality of storage devices are assigned; and
a server that is connected to the plurality of storage apparatuses via a network, and issues an access request with a virtual volume belonging to one of the storage apparatuses among the plurality of virtual volumes as an access target,
wherein the server includes a measurement unit for measuring a first latency during a random access by the server and a second latency during a sequential access by the server as a latency in a plurality of access paths connecting each of the storage apparatuses and the server;
wherein each of the storage apparatuses includes a control unit for controlling I/O of data to and from a virtual volume belonging to each of the storage apparatuses; and
wherein among the control units, each of which belongs to each of the storage apparatuses, a main control unit which manages allocation of the virtual volume belonging to each of the storage apparatuses based on a measured value of the measurement unit: retains a first I/O count during a random access in each of access paths connected to each of initiator ports of the server, and a second I/O count during a sequential access in each of the access paths connected to each of the initiator ports of the server and selects a plurality of combinations to become a processing target among a combination group of virtual volumes that are formed on an assumption that the plurality of virtual volumes will be distributed and allocated in each of the storage apparatuses; calculates, as (first I/O count in each of the access paths)×(first latency in each of the access paths)+(second I/O count in each of the access paths)× (second latency in each of the access paths), a load potential of each virtual volume connected to each of the initiator ports based on a measured value indicating a latency in each access path connecting each storage apparatus, in which each virtual volume belonging to the plurality of combinations to become the selected processing target exists, and the server, and each of the retained I/O counts; calculates a sum total of the load potential for each combination to become the processing target based on each calculated value; selects a combination in which the calculated value becomes smallest among the plurality of combinations to become the processing target; and allocates each virtual volume belonging to the selected combination to one of the storage apparatuses as an allocation destination when an allocation condition of the selected combination is satisfied.

7. The computer system according to claim 6, wherein, when there is a combination to be re-allocated among the plurality of combinations to become the processing target, the main control unit compares a first calculated value indicating a sum total of a load potential of each virtual volume belonging to an original combination of the combination to be re-allocated, and one or more second calculated values indicating a sum total of a load potential of each virtual volume belonging to another combination that is different from the original combination of the combination to be re-allocated, and, when there is a second calculated value that is smaller than the first calculated value among the second calculated values, selects a combination, which will result in a minimum value among the second calculated values, of the other different combination, and re-allocates each virtual volume belonging to the selected other different combination to one of the storage apparatuses.

8. The computer system according to claim 6, wherein the allocation condition of the selected combination is that a software resource that is applied in each virtual volume belonging to the selected combination can also be applied in the storage apparatus to become the allocation destination.

9. The computer system according to claim 6, wherein the allocation condition of the selected combination is that the storage apparatus to become the allocation destination is not undergoing maintenance.

* * * * *